(12) United States Patent
Strong et al.

(10) Patent No.: US 11,588,644 B2
(45) Date of Patent: *Feb. 21, 2023

(54) SECURE SNAPSHOT MANAGEMENT FOR DATA STORAGE DEVICES

(71) Applicant: Micron Technology, Inc., Boise, ID (US)

(72) Inventors: Robert W. Strong, Folsom, CA (US); Michael B. Danielson, Georgetown, TX (US)

(73) Assignee: Micron Technology, Inc., Boise, ID (US)

( * ) Notice: Subject to any disclaimer, the term of this patent is extended or adjusted under 35 U.S.C. 154(b) by 224 days.

This patent is subject to a terminal disclaimer.

(21) Appl. No.: 16/843,414

(22) Filed: Apr. 8, 2020

(65) Prior Publication Data

US 2020/0235942 A1  Jul. 23, 2020

Related U.S. Application Data

(63) Continuation of application No. 15/645,694, filed on Jul. 10, 2017, now Pat. No. 10,652,025.

(51) Int. Cl.
*G06F 21/62* (2013.01)
*H04L 9/32* (2006.01)
(Continued)

(52) U.S. Cl.
CPC ........ *H04L 9/3247* (2013.01); *G06F 11/1471* (2013.01); *G06F 21/51* (2013.01);
(Continued)

(58) Field of Classification Search
CPC ... H04L 9/3247; H04L 9/0891; H04L 9/3226; G06F 11/1471; G06F 21/51; G06F 21/602; G06F 21/64; G06F 21/78; G06F 2201/805; G06F 2201/82; G06F 2201/84; G06F 21/60; G06F 21/62; G06F 21/6209;
(Continued)

(56) References Cited

U.S. PATENT DOCUMENTS 6,263,445 B1  7/2001  Blumenau
7,756,986 B2  7/2010  Blumenau et al.
(Continued)

FOREIGN PATENT DOCUMENTS

| CN | 101763224 A | 6/2010 |
|---|---|---|
| TW | I493340 B | 7/2015 |
| WO | 2010114923 A1 | 10/2010 |

OTHER PUBLICATIONS

International Application No. PCT/US2018/038752—International Search Report and Written Opinion, dated Oct. 11, 2018, 13 pages.
(Continued)

*Primary Examiner* — Malcolm Cribbs
(74) *Attorney, Agent, or Firm* — Perkins Coie LLP

(57) ABSTRACT

A data storage device is provided. The data storage device includes a storage medium having a first subset configured to store user data and a second subset configured to store snapshot data. The data storage device further includes a controller configured to (i) receive, from a host operably coupled to the data storage device, a command to configure the second subset, to (ii) verify an authenticity of the command, and to (iii) execute the command in response to the verification of the authenticity of the command.

20 Claims, 2 Drawing Sheets

(51) Int. Cl.
*G06F 11/14* (2006.01)
*G06F 21/60* (2013.01)
*G06F 21/78* (2013.01)
*H04L 9/08* (2006.01)
*G06F 21/51* (2013.01)

(52) U.S. Cl.
CPC ............ *G06F 21/602* (2013.01); *G06F 21/62* (2013.01); *G06F 21/78* (2013.01); *H04L 9/0891* (2013.01); *H04L 9/3226* (2013.01); *G06F 2201/805* (2013.01); *G06F 2201/82* (2013.01); *G06F 2201/84* (2013.01)

(58) Field of Classification Search
CPC ... G06F 21/6218; H04l 63/0823; H04l 63/12; H04l 63/123; H04l 63/126
See application file for complete search history.

(56) References Cited

U.S. PATENT DOCUMENTS

| | | |
|---|---|---|
| 8,533,409 B2 | 9/2013 | Schnapp et al. |
| 8,615,663 B2 | 12/2013 | Buer |
| 9,871,772 B1 | 1/2018 | Weinstein et al. |
| 10,185,509 B1 | 1/2019 | Farhan et al. |
| 2001/0020254 A1 | 9/2001 | Blumenau et al. |
| 2004/0078654 A1 | 4/2004 | Holland et al. |
| 2005/0114402 A1 | 5/2005 | Guthrie |
| 2006/0149798 A1 | 7/2006 | Yamagami |
| 2007/0011137 A1 | 1/2007 | Kodama |
| 2007/0083567 A1 | 4/2007 | Arai et al. |
| 2007/0233950 A1 | 10/2007 | Innan et al. |
| 2008/0034004 A1 | 2/2008 | Cisler et al. |
| 2013/0054528 A1 | 2/2013 | Saika |
| 2013/0138904 A1 | 5/2013 | Min |
| 2013/0166914 A1 | 6/2013 | Vandervort |
| 2013/0254541 A1 | 9/2013 | Yamanaka et al. |
| 2014/0089265 A1 | 3/2014 | Talagala et al. |
| 2014/0149793 A1 | 5/2014 | Zaslavsky et al. |
| 2014/0258238 A1 | 9/2014 | Jin et al. |
| 2015/0180840 A1 | 6/2015 | Jung et al. |
| 2016/0112387 A1 | 4/2016 | Cignetti et al. |
| 2016/0124669 A1 | 5/2016 | Harris et al. |
| 2016/0357464 A1 | 12/2016 | Suzuki et al. |
| 2016/0378988 A1 | 12/2016 | Bhashkar et al. |
| 2017/0295167 A1 | 10/2017 | Robinson et al. |
| 2018/0020011 A1 | 1/2018 | Allo |
| 2019/0013949 A1 | 1/2019 | Strong et al. |

OTHER PUBLICATIONS

TW Patent Application No. 107122927—Taiwanese Office Action and Search Report, dated Dec. 9, 2019, with English Translation, 17 pages.

EP Patent Application No. 18832539.3—Extended European Search Report, dated Dec. 23, 2020, 9 pages.

KR Patent Application No. 10-2020-7003465—Korean Office Action and Search Report, dated Apr. 6, 2021, with English Translation, 10 pgs.

SECURE SNAPSHOT MANAGEMENT FOR DATA STORAGE DEVICES

CROSS-REFERENCE TO RELATED APPLICATION(S)

This application is a continuation of U.S. patent application Ser. No. 15/645,694, filed Jul. 10, 2017; which is incorporated herein by reference in its entirety.

TECHNICAL FIELD

The present disclosure generally relates to data storage devices, and more particularly relates to secure snapshot management for data storage devices.

BACKGROUND

Data storage devices can be implemented in non-volatile memory (e.g., flash drives, solid-state drives, etc.), magnetic storage media (e.g., hard disc drives, backup tapes) or any one of a number of other digital storage media. To ensure the integrity of data stored on rewritable data storage devices, any number of various backup techniques can be utilized to preserve data against accidental data loss (e.g., via unintentional overwriting or deletion). One approach to data backup utilizes "snapshots," an approach in which a data state or snapshot is preserved from further changes by storing any updates or changes to the data in the snapshot to a different physical location in the storage device (e.g., via "redirect-on-write").

While the snapshot approach is effective in protecting data from accidental data loss, malicious data modification or destruction poses additional challenges. For example, an increasing trend in digital crime involves "ransomware" attacks, in which unauthorized users or processes can encrypt data in a data storage device in such a way that recovery is impracticable or even impossible without the decryption key. The ransomware attacker can then "ransom" the encrypted data by demanding payment for the decryption key, frequently with the threat that the encrypted data will be deleted if payment is not received in an amount, format and timeframe of the attacker's choosing.

As the sophistication of ransomware attacks has grown, the protection offered by conventional snapshot management approaches has declined. Because the host device to which a conventional data storage device is attached is capable of managing the snapshots on the data storage device (e.g., by overwriting them with updated data or deleting them), sophisticated ransomware that targets all backup data for encryption, including snapshots in data storage devices attached to the host targeted by the ransomware attack, can overcome the protection offered by conventional snapshot management by exploiting the ability of the host to modify the snapshots.

In addition to the growing threat of ransomware, additional threats to data integrity that conventional snapshot management techniques are ill-equipped to address include various other malicious data deletion threats (e.g., by viruses, worms, or the like) and malicious data modification threats (e.g., by unauthorized users to subvert financial or legal records) that can likewise exploit the ability of a host device to overwrite or delete snapshots in attached data storage devices. Accordingly, there is a need for improved techniques to protect the integrity of stored data.

DETAILED DESCRIPTION

In the following description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with semiconductor devices are not shown, or are not described in detail, to avoid obscuring other aspects of the technology. In general, it should be understood that various other devices, systems, and methods in addition to those specific embodiments disclosed herein may be within the scope of the present technology.

As discussed above, some approaches to data storage device management involve saving snapshots of data states in a data storage device to preserve data from subsequent changes via redirect-on-write (ROW). If the host to which a conventional data storage device is attached (e.g., directly or indirectly over a communication path) is compromised by a ransomware attack or other malicious activity, the snapshots may be modified (e.g., encrypted) or deleted. Accordingly, several embodiments of data storage devices and computing systems in accordance with the present technology can provide secure snapshot management to prevent unauthorized changes to or deletions of snapshots.

Several embodiments of the present technology are directed to data storage devices comprising a storage medium including a first subset configured to store user data and a second subset configured to store snapshot data. The devices can include a controller configured to (i) receive, from a host operably coupled to the data storage device, a command to configure the second subset, to (ii) verify an authenticity of the command, and to (iii) execute the command, if it is verified to be authentic.

Figure 1:
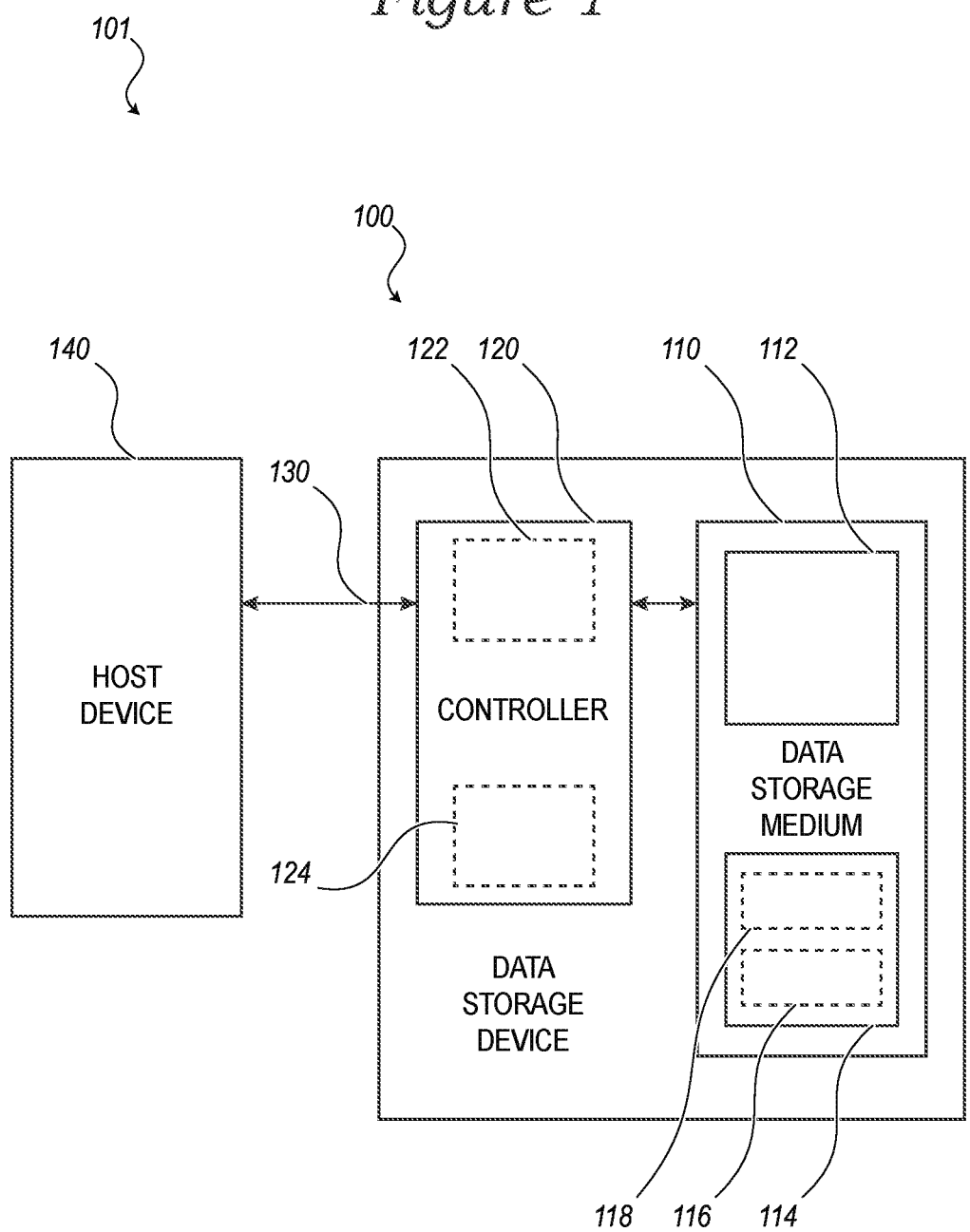
FIG. 1 is a schematic block diagram illustrating a computer system including a data storage device in accordance with an embodiment of the present technology.

FIG. 1 schematically illustrates a computing system 101 including a data storage device 100 in accordance with an embodiment of the present technology. The data storage device 100 includes a data storage medium 110 and a controller 120. The controller 120 can be a microcontroller, special purpose logic circuitry (e.g., a field programmable gate array (FPGA), an application specific integrated circuit (ASIC), etc.), or other suitable processor. The controller 120 can include a processor 122 configured to execute instructions stored in memory. In the illustrated example, the memory of the controller 120 includes an embedded memory 124 configured to store various processes, logic flows, and routines for controlling operation of the data storage device 100, including managing the data storage medium 110 and handling communications between the data storage device 100 and a host device 140 via system bus 130. In some embodiments, the embedded memory 124 can include memory registers storing, e.g., memory pointers, fetched data, etc. The embedded memory 124 can also include read-only memory (ROM) for storing micro-code.

The data storage device communicates with the host device 140 over a system bus 130. In some embodiments, the host device 140 and the controller 120 of the data storage device 100 can communicate over a serial interface, such as a serial attached SCSI (SAS), a serial AT attachment (SATA) interface, a peripheral component interconnect express (PCIe), or other suitable interface (e.g., a parallel interface). The host device 140 can send various requests (in the form of, e.g., a packet or stream of packets) to the controller 120. A request can include a command to write, erase, return information, and/or to perform a particular operation.

The data storage medium 110 can utilize any one of a number of data storage media suitable for rewritably storing digital data, including solid state formats (e.g., volatile memory such as SRAM, DRAM and the like, non-volatile memory such as NAND flash memory, NOR flash memory, phase change memory, ferroresistive memory, magnetoresistive memory, etc.) and mechanical formats (e.g., magnetic hard disc drives, magnetic tapes, etc.). The data storage medium 110 includes a user data subset 112 configured to store user data and a snapshot data subset 114 configured to store snapshot data. The user data subset 112 and the snapshot data subset 114 can be any one of a number of subsets used to subdivide the data storage medium 110, including partitions, sub-partitions, mount points, LBA ranges, sectors, separate memory dies, etc.

In accordance with an embodiment of the present technology, the controller 120 is configured to implement a redirect-on-write scheme to store both a snapshot 116 (e.g., a data state of the data storage device 100) and updates 118 to the data of the snapshot 116 within the snapshot data subset 114. The snapshot data subset 114 can be overprovisioned to provide sufficient space to track the updates 118 to the data of the snapshot 116. The level of overprovisioning can be anywhere from 0% (e.g., where no changes to the snapshot 116 can be stored in the snapshot data subset 114), to 100% (e.g., where enough space is provided so that every bit of data of the snapshot 116 can be changed), or even more (e.g., where enough space is provided so that additional data can be appended to the snapshot 116 while tracking updates 118 to the snapshot 116).

For example, in one embodiment of the present technology the snapshot 116 may require, e.g., 500 MB of storage space. The data storage device 100 can be configured to maintain an unchanged copy of the snapshot 116, such that updates 118 (e.g., additions, modifications, deletions, etc.) to the data of the snapshot 116 are stored in a location within the snapshot data subset 114 other than that used to store the snapshot 116. The controller 120 can maintain a table that tracks the locations of both the snapshot 116 and the updates 118, so that a host read on the snapshot data can return the updated data, while preserving the ability to "roll back" to the earlier version of the data, if desired.

Although greater levels of over-provisioning can provide for space to track more updates 118 to the data of the snapshot 116, they also reduce the relative size of the user data subset 112. Accordingly, an over-provisioning factor for the snapshot data subset 114 can be selected to achieve a balance of data tracking and cost/capacity. When the capacity of the snapshot data subset 114 for tracking updates 118 is exhausted, the controller 120 can overwrite the snapshot 116 with a newer version of the data (e.g., merging the updates 118 and the snapshot 116 into a new snapshot, freeing up the space in the snapshot data subset 114 consumed by the updates 118). As this function is one that could be exploited by malicious code or a malicious actor to modify or overwrite (e.g., with an encrypted version) the data of the snapshot 116, embodiments of the present invention provide a way to prevent this and other operations that seek to configure the snapshot data subset without authorization.

In contrast to a conventional data storage device, in which all of the commands received from a host device are treated as trustworthy, the data storage device 100 of the present embodiment can be configured to require authentication of host commands that seek to configure the snapshot data subset 114 (e.g., commands that seek to overwrite or delete the snapshot 116, to merge the updates 118 with the snapshot 116, to resize the snapshot data subset 114, etc.). By requiring authentication from the connected host device 140 before taking any action that could irretrievably alter the snapshot 116 (e.g., as compared to commands that simply record changes to the snapshot 116 in the form of updates 118 in the snapshot data subset 114), the snapshot 116 can be preserved from both accidental and malicious changes and/or deletions.

Controller 120 can be configured to verify the authenticity of a command to configure the snapshot data subset 114 in any one of a number of ways. For example, in one embodiment of the present technology, the controller 120 can exchange cryptographic keys with the connected host device 140 during an initial set-up of the data storage device 100 (e.g., when data storage device 100 is first connected to the host device 140, or upon reformatting data storage device 100, etc.). After exchanging the cryptographic keys, the controller 120 can verify the authenticity of a command to configure the snapshot data subset 114 by determining whether the command has been signed with the predetermined cryptographic key, and only execute the command upon a determination of authenticity. In this way, the connected host device 140 can reduce the likelihood of malicious data loss by securing the cryptographic key in a secure key store, and by only generating and cryptographically signing commands to configure the snapshot data subset 114 from within a secure code execution enclave (e.g., Intel® Software Guard Extensions). As such secure code execution enclaves are more resistant to unauthorized access (e.g., from ransomware attacks or other malicious processes), the integrity of the snapshot 116 stored in the snapshot data subset 114 can better assured than if any executable process on the host were permitted to configure the snapshot data subset 114.

In another embodiment, controller 120 can be configured to verify the authenticity of a command to configure the snapshot data subset 114 using password-based authentication. For example, in one embodiment of the present technology, the controller 120 can either provide to the connected host device 140, or be assigned by the connected host device 140, an authentication password during an initial set-up of the data storage device 100 (e.g., when data storage device 100 is first connected to the host, or upon reformatting data storage device 100, etc.). The controller 120 can subsequently verify the authenticity of a command to configure the snapshot data subset 114 by soliciting the password, or by determining whether it has been provided together with the command, and only execute the command upon a determination of authenticity. Moreover, those skilled in the art will readily appreciate that any one of a number of different authentication methods may be employed to allow the data storage device 100 to verity the authenticity of a command to configure the snapshot data subset 114 beyond key-based or password-based authentication.

In accordance with an aspect of the present technology, the controller 120 can be configured to provide a notification to the host device 140 when the available space in the snapshot data subset 114 falls below a predetermined threshold. In this regard, the notification can be an asynchronous notification that does not require a response from the host device 140. The notification can alert the host device 140, or a user thereof, that an authenticated command to configure the snapshot data subset 114 should be generated (e.g., to increase the size of the snapshot data subset, to merge the updates 118 with the snapshot 116, etc.). In another embodiment, the controller 120 can be configured to 'stall' (e.g., to fail data writes) when the available space in the snapshot data subset 114 falls below a predetermined threshold. In still another embodiment, when the available space in the snapshot data subset 114 falls below a predetermined threshold, the controller 120 can be configured to throttle communications with the host device 140 (e.g., slowing the I/O). The throttling can be done in combination with a notification to the host device 140, whereby the throttling can remain in place until the host device 140 takes an action to increase the available space in the snapshot data subset 114 (e.g., by increasing the size of the snapshot data subset 114, by committing the updated 118 to the snapshot data 116, or by purging some or all of the updates 118).

Although in the foregoing embodiment, the data storage device 100 is illustrated as including a single snapshot data subset 114, in other embodiments of the present technology multiple snapshot data subsets can be provided in a single data storage device (e.g., to secure different snapshots with the same or different levels of over-provisioning). Moreover, although the snapshot data subset 114 of the foregoing embodiment is illustrated as including a single snapshot 116, in other embodiments of the present technology multiple snapshots can be stored in a single snapshot data subset (e.g., to track multiple data states at different times, any one of which can be restored by a connected host device). Furthermore, although the foregoing embodiment has been described with reference to snapshot data protected from change by redirect-on-write implementations, the present technology has application to other data backup methodologies that secure data against unintentional changes (e.g., read-only partitions, read-only files, etc.), such that commands from a connected host device to modify secured data can be verified for authenticity by a data storage device before being executed.

Figure 2:
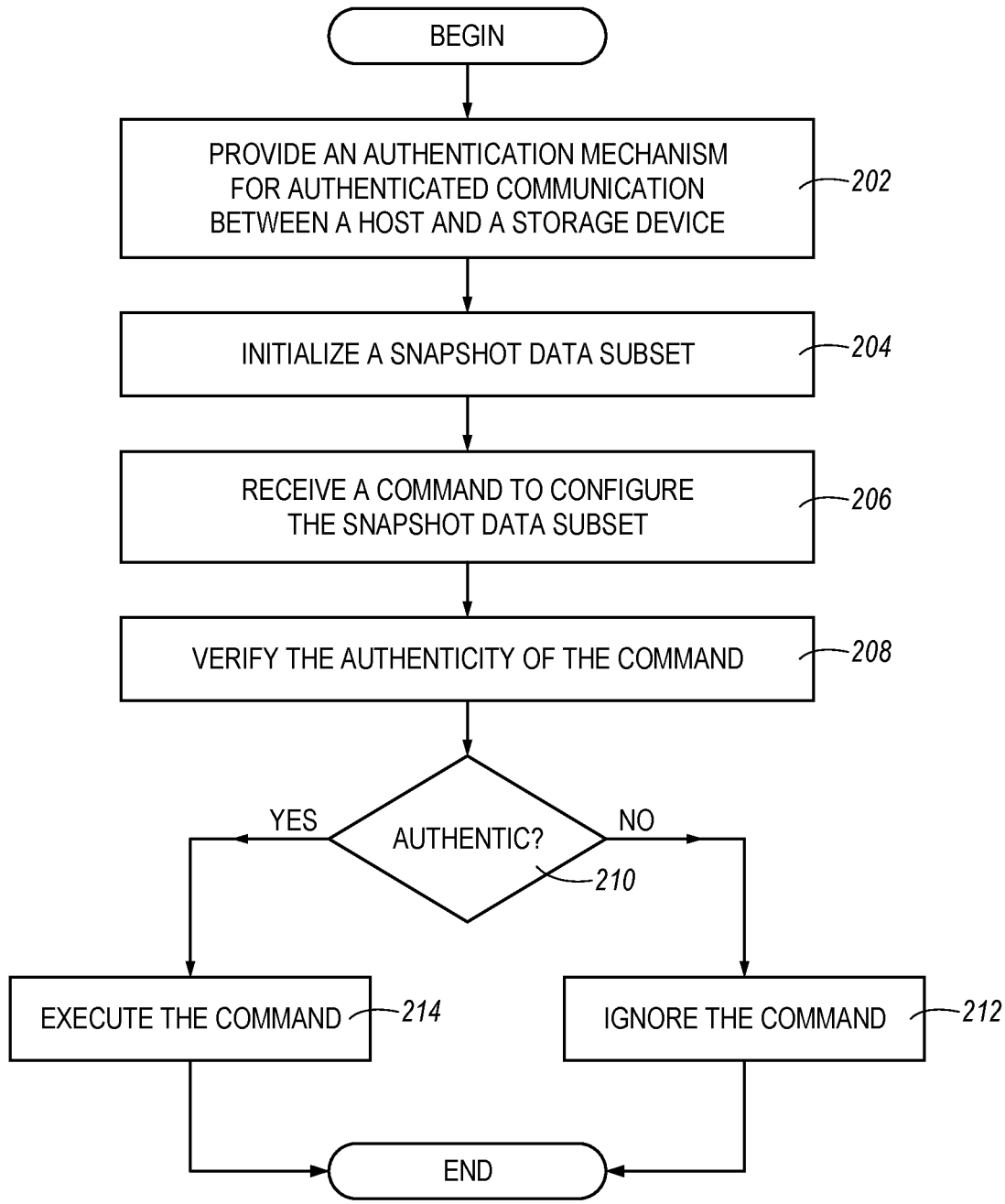
FIG. 2 is a flow chart illustrating a method of managing a data storage device in accordance with an embodiment of the present technology.

FIG. 2 is a flow chart illustrating a method of managing a data storage device in accordance with an embodiment of the present technology. The method includes providing an authentication mechanism for authenticated communication between a host device and a data storage device (box 202) and initializing a secure snapshot data subset in the data storage device (box 204). The method further includes receiving a command to configure the snapshot data subset (box 206) and verifying the authenticity of the command (box 208). If the command is determined to be authentic (determination 210), the command is executed (box 214); if not, the command is ignored (box 212).

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A data storage device, comprising:
 a storage medium including a first subset configured to store user data and a second subset configured to store snapshot data;
 a controller configured to:
  receive, from a host operably coupled to the data storage device, commands to modify the snapshot data, including first commands that do not require authentication and second commands that require authentication, wherein the second commands that require authentication include a command to overwrite the snapshot data stored in the second subset;
  verify an authenticity of the snapshot override command; and
  execute the command in response to the verification of the authenticity of the snapshot override command.

2. The data storage device according to claim 1, wherein the controller is configured to verify the authenticity of the snapshot override command by verifying that the snapshot override command has been signed with a predetermined cryptographic key.

3. The data storage device according to claim 2, wherein the predetermined cryptographic key is generated by the data storage device and provided to the host device during an initial configuration of the data storage device.

4. The data storage device according to claim 3, wherein the predetermined cryptographic key is provided to the host device over an encrypted communication channel.

5. The data storage device according to claim 1, wherein the controller is configured to ignore the snapshot override command if the snapshot override command is not verified to be authentic.

6. The data storage device according to claim 1, wherein the controller is further configured to:
 receive, from the host, an instruction to update the snapshot data in the second subset with modified data, and
 store the modified data in the second subset without overwriting the snapshot data.

7. The data storage device according to claim 1, wherein the controller is further configured to generate a notification to the host when the snapshot data has consumed a predetermined portion of a capacity of the second subset.

8. The data storage device according to claim 1, wherein the second subset is one of a partition, a mount point, or an address range of the storage medium.

9. The data storage device according to claim 1, wherein the storage medium is a flash memory.

10. A computing system, comprising:
 a host device,
 a storage medium operably coupled to the host device, wherein the storage medium includes a first subset configured to store user data and a second subset configured to store snapshot data; and
 a storage controller configured to:
  receive commands to modify the snapshot data, including first commands that do not require authentication and second commands that require authentication, wherein the second commands that require authentication include a command to overwrite the snapshot data stored in the second subset;
  verify an authenticity of the snapshot overwrite command; and
  execute the snapshot overwrite command in response to the verification of the authenticity of the snapshot overwrite command.

11. The computing system according to claim 10, wherein the controller is configured to verify the authenticity of the snapshot overwrite command by verifying that the snapshot overwrite command has been signed with a predetermined cryptographic key.

12. The computing system according to claim 11, wherein the predetermined cryptographic key is generated by the storage controller and provided to the host device over an encrypted communication channel.

13. The computing system according to claim 12, wherein the storage controller is configured to receive a command that is signed with the predetermined cryptographic key.

14. The computing system according to claim 10, wherein the storage controller is configured to ignore the snapshot overwrite command if the command is not verified to be authentic.

15. The computing system according to claim 10, wherein the storage controller is further configured to:
   receive an instruction to update the snapshot data in the second subset with modified data, and
   store the modified data in the second subset without overwriting the snapshot data.

16. The computing system according to claim 10, wherein the storage controller is further configured to generate a notification to the host device when the snapshot data has consumed a predetermined portion of a capacity of the second subset.

17. The computing system according to claim 10, wherein the second subset is one of a partition, a mount point, or an address range of the storage medium.

18. The computing system according to claim 10, wherein the storage medium is a flash memory.

19. A method of managing a data storage device including a storage medium having a first subset configured to store user data and a second subset configured to store snapshot data, the method comprising:
   receiving, from a host operably coupled to the data storage device, commands to modify the snapshot data, including first commands that do not require authentication and second commands that require authentication, wherein the second commands that require authentication include a command to overwrite the snapshot data stored in the second subset;
   verifying an authenticity of the snapshot overwrite command; and
   executing the snapshot overwrite command in response to the verification of the authenticity of the snapshot overwrite command.

20. The method according to claim 19, further comprising:
   receiving, from the host, an instruction to update the snapshot data in the second subset with modified data, and
   storing the modified data in the second subset without overwriting the snapshot data.

* * * * *